United States Patent
Elias

(10) Patent No.: US 10,890,952 B2
(45) Date of Patent: Jan. 12, 2021

(54) COVER FOR ELECTRONIC DEVICE

(71) Applicant: Apple Inc., Cupertino, CA (US)

(72) Inventor: John G. Elias, Townsend, DE (US)

(73) Assignee: APPLE INC., Cupertino, CA (US)

( * ) Notice: Subject to any disclaimer, the term of this patent is extended or adjusted under 35 U.S.C. 154(b) by 0 days.

(21) Appl. No.: 15/979,114

(22) Filed: May 14, 2018

(65) Prior Publication Data

US 2018/0329453 A1 Nov. 15, 2018

Related U.S. Application Data

(63) Continuation of application No. 13/624,868, filed on Sep. 21, 2012, now Pat. No. 10,139,868.

(51) Int. Cl.
*G06F 1/16* (2006.01)

(52) U.S. Cl.
CPC ............ *G06F 1/169* (2013.01); *G06F 1/1626* (2013.01); *G06F 1/1679* (2013.01); *G06F 2200/1633* (2013.01)

(58) Field of Classification Search
CPC ... A45C 2013/025; A45C 13/02; A45C 11/00; B65D 85/64; B65D 85/00; G06F 1/169; G06F 1/1626; G06F 1/1679; G06F 1/1633; G06F 1/1615; G06F 2200/1633
USPC .......... 206/320, 45.2, 45.23, 45.24; 361/147, 361/679.17, 679.22, 679.01, 679.02, 361/679.09, 679.26, 679.55, 781; 455/575.8, 575.1
See application file for complete search history.

(56) References Cited

U.S. PATENT DOCUMENTS

| | | | |
|---|---|---|---|
| 3,769,741 A | 11/1973 | Hessler et al. | |
| 8,132,670 B1 | 3/2012 | Chen | |
| 8,607,976 B2 | 12/2013 | Wu | |
| 8,724,300 B2 | 5/2014 | Smith et al. | |
| 8,746,446 B2 | 6/2014 | Chiang | |
| 2005/0200608 A1 | 9/2005 | Ulla et al. | |
| 2008/0096620 A1* | 4/2008 | Lee | G06F 1/1626 455/575.8 |
| 2010/0078343 A1 | 4/2010 | Hoellwarth et al. | |
| 2010/0197369 A1* | 8/2010 | Mourali | H04B 1/3838 455/575.1 |
| 2011/0043227 A1* | 2/2011 | Pance | H03K 17/98 324/681 |
| 2012/0008269 A1 | 1/2012 | Gengler | |
| 2012/0106078 A1 | 5/2012 | Probst et al. | |
| 2012/0113007 A1* | 5/2012 | Koch | G06F 3/0488 345/168 |
| 2012/0154288 A1* | 6/2012 | Walker | G06F 1/1616 345/169 |
| 2012/0229960 A1 | 9/2012 | Pegg et al. | |
| 2012/0235919 A1* | 9/2012 | Earnshaw | G06F 3/0213 345/169 |
| 2012/0306752 A1* | 12/2012 | Hosoya | G06F 3/04892 345/168 |
| 2013/0140203 A1 | 6/2013 | Chiang | |

(Continued)

*Primary Examiner* — Rafael A Ortiz
(74) *Attorney, Agent, or Firm* — Dorsey & Whitney LLP

(57) ABSTRACT

A protective covering for an electronic device such as a tablet computer. In various embodiments, to protective covering may cover both front and rear surfaces of the electronic device, as well as from and rear surfaces of an associated keyboard. Additionally, certain configuration for the protective covering may operate to trigger a sleep mode for the keyboard.

4 Claims, 10 Drawing Sheets

(56) References Cited

U.S. PATENT DOCUMENTS

| | | | |
|---|---|---|---|
| 2013/0266164 A1* | 10/2013 | Woods | H04R 25/70 |
| | | | 381/314 |
| 2013/0271373 A1* | 10/2013 | Milhe | G06F 1/1671 |
| | | | 345/168 |
| 2013/0299326 A1 | 11/2013 | Hsu | |
| 2014/0009498 A1* | 1/2014 | Bismilla | G09G 5/363 |
| | | | 345/650 |
| 2014/0028564 A1* | 1/2014 | Valentine | G06F 1/1662 |
| | | | 345/168 |
| 2014/0036438 A1 | 2/2014 | Gioscia et al. | |

* cited by examiner

COVER FOR ELECTRONIC DEVICE

CROSS-REFERENCE TO RELATED APPLICATION

This application is a continuation of U.S. patent application Ser. No. 13/624,868, filed Sep. 21, 2012, entitled "Cover for Electronic Device," which is incorporated by reference in its entirety as if fully disclosed herein.

TECHNICAL FIELD

This disclosure generally relates to protective coverings for electronic devices.

BACKGROUND

Electronic devices such as tablet computers and the like may be used in combination with coverings that protect the device. Typically, protective coverings for tablet computers extend over the surface area of the touch screen component of the tablet computer. The need to protect this valuable component of the tablet computer is well understood by makers of protective coverings. However, users may also be concerned with protecting the rear surface of the tablet computer from scratches, dings, or other damage that may create an unsightly appearance for the tablet computer. Thus, there may be a need for protective coverings for all surfaces of an electronic device such as a tablet computer.

Additionally electronic devices such as tablet computers may be configured with peripheral components such as wireless keyboards that provide a mechanism for entering input. In some configurations, the keyboard may be used to enter input in combination with or in lieu of the touchscreen component of a tablet computer. As a component such as a wireless keyboard may also be vulnerable to damage, it may be desirable to have a covering that protects both the tablet computer and an associated keyboard.

SUMMARY

In various embodiments, the present disclosure relates to a tablet computer accessory, comprising a cover having an interior surface that attaches to a rear surface of a tablet computer and to the rear surface of a keyboard that is in communication with the tablet computer; a first lateral hinge in the cover that allows the cover to fold such that a first end of the cover rotates about the first lateral hinge from an extended position towards a centerline of the cover; a second lateral hinge in the cover that allows the cover to fold such that a second end of the cover rotates about the second lateral hinge from an extended position towards the centerline of the cover; and a closure configured to disable the keyboard when a first closure component disposed on the first end of the cover meets a second closure component disposed on the second end of the cover, the first and second closure components configured to meet substantially at the centerline of the cover when the cover is folded about the first and second lateral hinges.

In some embodiments, the cover has a closed configuration in which the first and second ends of the cover are rotated towards the interior surface of the cover such that the first and second closure components meet substantially at the centerline of the cover to enclose the tablet computer and the keyboard within the cover.

In some embodiments, the cover has an open configuration in which the first and second ends of the cover are rotated away from the interior surface of the cover such that the first and second closure components meet substantially at the centerline of the cover and the tablet computer and the keyboard remain external to the cover.

In some embodiments, the cover has a flat configuration in which the first and second ends of the cover are not rotated about the first and second hinges, the first and second closure components do not meet, and the key board is not disabled.

Some embodiments further comprise a central hinge in the cover that coincides with the centerline of the cover and that allows the cover to fold such that a first cover half is allowed to rotate relative to a second cover half about the central hinge.

In some embodiments, the first lateral hinge coincides with a midline of the first cover half such that the first lateral hinge divides the first cover half into a first cover section and a second cover section, the first cover section containing the first end of the cover; the second lateral hinge coincides with a midline of the second cover half such that the second lateral hinge divides the second cover half into a third cover section and a fourth cover section, the fourth cover section containing the second end of the cover; the keyboard being attached to the first cover section; and the tablet computer attached to the second and third cover sections.

In some embodiments, the tablet computer is fixedly attached to the second cover section and detachably attached to the third cover section.

In some embodiments, the cover has a standing configuration in which the cover is folded away from the interior surface of the cover along the central hinge and the second lateral hinge such that the second, third and forth sections of the cover form a triangular support for the tablet computer.

In some embodiments, when the cover is in the standing configuration, the cover is folded toward the interior surface of the cover along the first lateral hinge such that the keyboard is disposed at an angle relative to the tablet computer.

In some embodiments, when the cover is in the standing configuration, the first and second closure components do not meet and the keyboard is not disabled.

Some embodiments further comprise a first magnet associated with the first closure component; and a second magnet associated with the second closure component; wherein the first and second magnet act on each other to hold the first and second ends of the cover together when the first and second closure components meet at substantially the centerline of the cover.

In some embodiments, when the first and second magnets act on each other, the first and second magnets also close a circuit that disables the keyboard.

Some embodiments further comprise a first conductive contact associated with the first closure component; and a second conductive contact associated with the second closure component; wherein the first and second conductive contacts close a circuit to disable the keyboard when the first and second closure components meet at substantially the centerline of the cover.

Some embodiments further comprise a first conductive plate associated with the first closure component; and a second conductive plate associated with the second closure component; wherein the first and second conductive plates create a capacitive circuit element that completes a circuit that disables the keyboard when the first and second closure components meet at substantially the centerline of the cover.

In various embodiments, the present disclosure relates to a method of disabling a keyboard, comprising folding a cover about a first lateral hinge such that a first end of the cover rotates about the first lateral hinge from an extended position towards a centerline of the cover, wherein a tablet computer and a keyboard are attached to an interior surface of the cover; folding the cover about a second lateral hinge such that a second end of the cover rotates about the second lateral hinge from an extended position towards the centerline of the cover; and engaging a closure to disable the keyboard when a first closure component disposed on the first end of the cover meets a second closure component disposed on the second end of the cover at substantially the centerline of the cover.

Some embodiments further comprise enclosing the tablet computer and the keyboard within the cover by rotating the first and second end of the cover towards the interior surface of the cover.

Some embodiments further comprise rotating the first and second end of the cover away from an interior surface of the cover such that the tablet computer and the keyboard remain external to the cover.

In various embodiments, the present disclosure relates to a method of enabling a keyboard, comprising unfolding a cover about a first lateral hinge such that a first end of the cover rotates about the first lateral hinge away from a centerline of the cover and towards an extended position, wherein a tablet computer and a keyboard are attached to an interior surface of the hinge; unfolding the cover about a second lateral hinge such that a second end of the cover rotates about the second lateral hinge away from the centerline of the cover and towards an extended position; and disengaging a closure to enable the keyboard when a first closure component disposed on the first end of the cover and a second closure component disposed on the second end of the cover move away from the centerline of the cover and disengage from each other.

Some embodiments further comprise removing the tablet computer and the keyboard from within the interior of the cover by rotating the first and second end of the cover away from the interior surface of the cover.

Some embodiments further comprise moving the keyboard and the tablet computer into operative alignment by rotating the first and second end of the cover towards the interior surface of the cover.

DETAILED DESCRIPTION

Figure 1A:
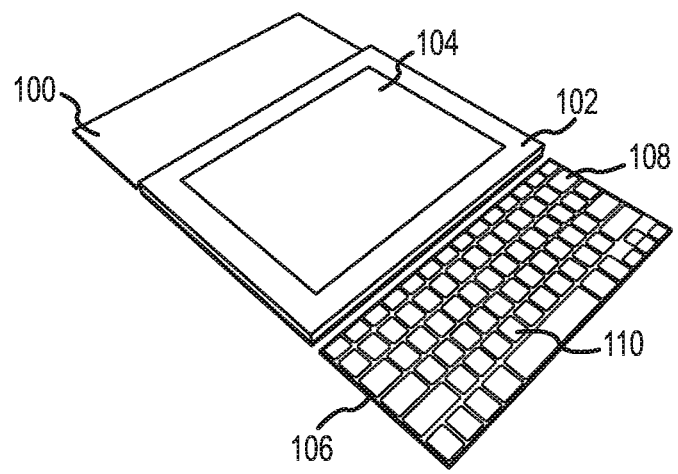
FIG. 1A is a perspective illustration of an electronic device cover embodiment that is attached to a tablet computer and a keyboard.

FIG. 1A is a perspective illustration of an electronic device cover 100 in accordance with embodiments discussed herein. As shown in FIG. 1A, the cover 100 is attached to a tablet computer 102, such as the iPad developed by Apple Inc. Generally, the tablet computer 102 may be a device that incorporates a computing system and an enlarged touchscreen 104 within a single enclosure. The touch screen 104 is integrally formed with the tablet computer 102 and provides a mechanism for both receiving input and providing output. More specifically, the touch screen 104 includes a transparent and/or semitransparent touch sensitive panel incorporated with a display device. As a display device, the touchscreen 104 allows the tablet computer 102 to transmit or otherwise display graphical data and information. As a touch sensitive panel, the touchscreen 104 provides a mechanism for entering touch input directly into the tablet computer 102.

In some instances, the tablet computer 102 may drive the touchscreen 104 with graphical data to display a graphical user interface (GUI). The GUI may be configured to receive touch input via the touch sensitive panel. The GUI may include graphical elements displayed at particular locations within the interface. Graphical elements may include but are not limited to a variety of displayed virtual input devices including virtual scroll wheels, a virtual keyboard, virtual knobs or dials, virtual buttons, virtual levers, any virtual UI, and the like. A user may perform gestures at one or more particular locations on touchscreen 104 which may be associated with the graphical elements of the GUI.

In order for the tablet computer 102 to receive touch input, the touchscreen 104 may be configured to detect the location of one or more touches or near touches at the touchscreen 104 based on measurements of physical phenomena that occur in near touchscreen 104 when those touches or near touches occur. For example, the touchscreen 104 may be configured to acquire capacitive, resistive, optical, acoustic, inductive, mechanical, chemical, or electromagnetic measurements that indicate the location of touches or near touches on the touchscreen 104. Software, hardware, firmware or any combination thereof may be used to process the measurements of the detected touches to identify and track one or more gestures.

In addition to the touchscreen 104, the tablet computer 102 may receive input from other sources such as a keyboard, mouse, or possibly other devices. In the configuration shown in FIG. 1A, the tablet computer 102 is configured to receive input from a keyboard 106, which may communicate with the tablet computer 102 via a wired or wireless communication channel. As shown in FIG. 1A, the cover 100 is attached to both the tablet computer 102 and the keyboard 106. More specifically, the cover 100 attaches to the rear surfaces of both the tablet computer 102 and the keyboard 106.

The keyboard 106 may be a Multi-Touch keyboard that is adapted to receive both keyboard input and touch input. In this regard, the keyboard 106 includes a transparent and/or semitransparent touch sensitive panel incorporated with a plurality of keys 108 arranged in a keyboard configuration.

Figure 1B:
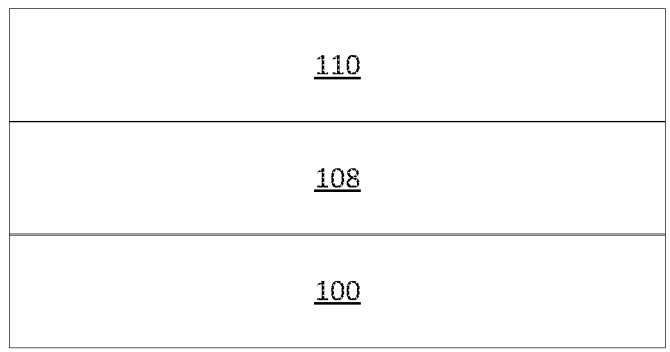
FIG. 1B is a schematic view of a smooth surface which overlays a key on an electronic device cover.
Figure 2A:
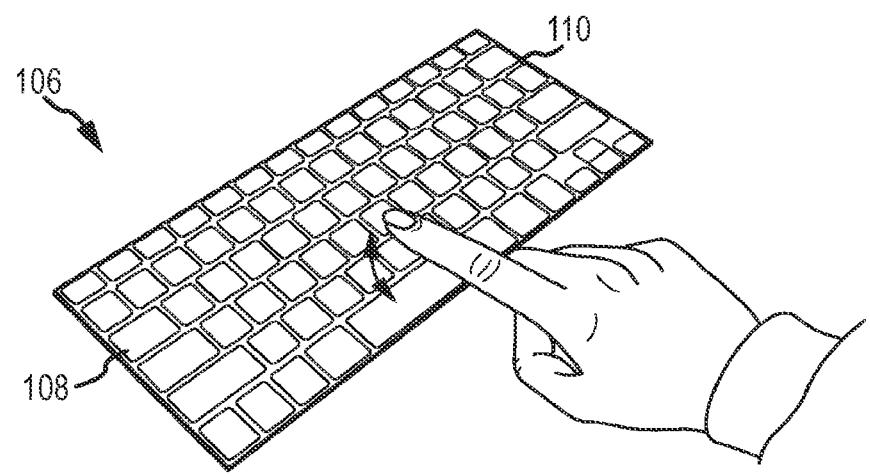
FIG. 2A is a perspective illustration of a user striking a key on the keyboard shown in FIG. 1A.
Figure 2B:
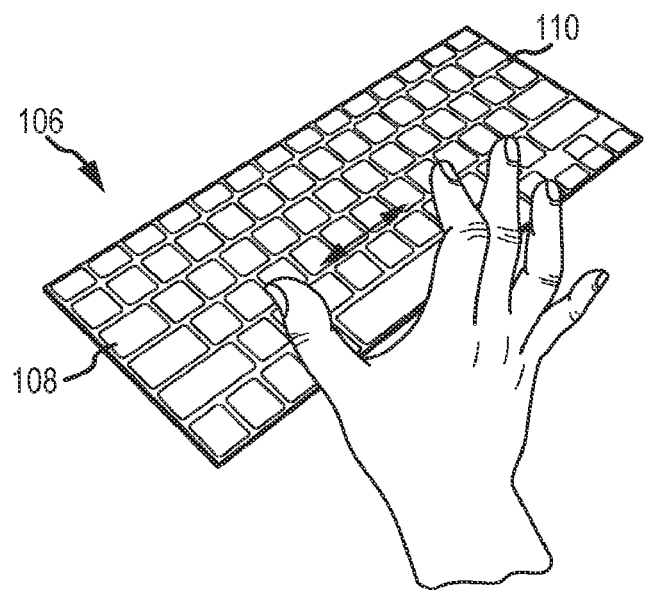
FIG. 2B is a perspective illustration of a user entering touch input on the keyboard shown in FIG. 1.

In one embodiment, the keyboard 106 includes a smooth surface 110 that overlays the plurality of keys 108, which are disposed underneath the smooth surface 110 (see FIGS. 1A and 1B). Thus, in one respect, as shown in FIG. 2A, a user may provide input to the tablet computer 102 by striking the smooth surface 110 above a particular key 108. In another respect, as shown in FIG. 2B, a user may provide input to the tablet computer 102 by sliding gestures or other movements along the smooth surface 110 that overlays the keys 108.

In order for the keyboard 106 to receive touch input, the keyboard 106 may be configured to detect the location of one or more touches or near touches at the surface 110 based on measurements of physical phenomena that occur in near the surface 110 when those touches or near touches occur. For example, the keyboard 106 may be configured to acquire capacitive, resistive, optical, acoustic, inductive, mechanical, chemical, or electromagnetic measurements that indicate the location of touch or near touch on the surface 110 of the keyboard 106. Software, hardware, firmware or any combination thereof may be used to process the measurements of the detected touches to identify and track one or more gestures.

As described above, touch input may be entered through gestures entered through either the touchscreen 104 of the tablet computer 102 or through the surface 110 of the keyboard 106. As used herein a "gesture" may correspond to stationary or non-stationary, single or multiple, touches or near touches on the touchscreen 104 or the surface 110 of the keyboard 106. A gesture may be performed by moving one or more fingers or other objects in a particular manner on the touchscreen 104 or the surface 110 of the keyboard 106 such as tapping, pressing, rocking, scrubbing, twisting, changing orientation, pressing with varying pressure and the like at essentially the same time, contiguously, consecutively, or otherwise. A gesture may be characterized by, but is not limited to a pinching, sliding, swiping, rotating, flexing, dragging, tapping, pushing and/or releasing, or other motion between or with any other finger or fingers, or any other portion of the body or other object. A single gesture may be performed with one or more hands, or any other portion of the body or other object by one or more users, or any combination thereof.

Touch input entered through the touchscreen 104 of the tablet computer may differ from touch input entered through the surface 110 of the keyboard 106 in that a user may directly interact with a graphical object through gestures entered through the touchscreen 104. Specifically, gestures performed on the touchscreen 104 may directly or indirectly manipulate, control, modify, move, actuate, initiate or generally affect graphical elements such as cursors, icons, media files, lists, text, all or portions of images, or the like within the GUI. For instance, in the case of a touchscreen 104, a user may directly interact with a graphical element by performing a gesture over the graphical element on the touch screen. In contract, the surface 110 of the keyboard 106 generally functions as a touchpad a touch pad that provides indirect interaction with graphical elements.

As an example of touch input entered through the surface 110 of the keyboard 106 a user may enter gestures in conjunction with a displayed cursor. For instance, by operating the keyboard 106 as a trackpad, a cursor (or pointer) may be displayed on a display screen or touch screen and the cursor may be controlled via touch input on the surface 110 of the keyboard 106 to interact with graphical objects on the display screen. It should be appreciated that in addition to using the keyboard as a trackpad to interact with graphical objects, the user may also enter gestures directly on the touchscreen 104 to thereby directly interact with the graphical objects as they are displayed. It should be appreciated that gestures may also affect non-displayed GUI elements (e.g., causing user interfaces to appear) or may affect other actions within tablet computer 102 (e.g., affect a state or mode of a GUI, application, or operating system).

Figure 3:
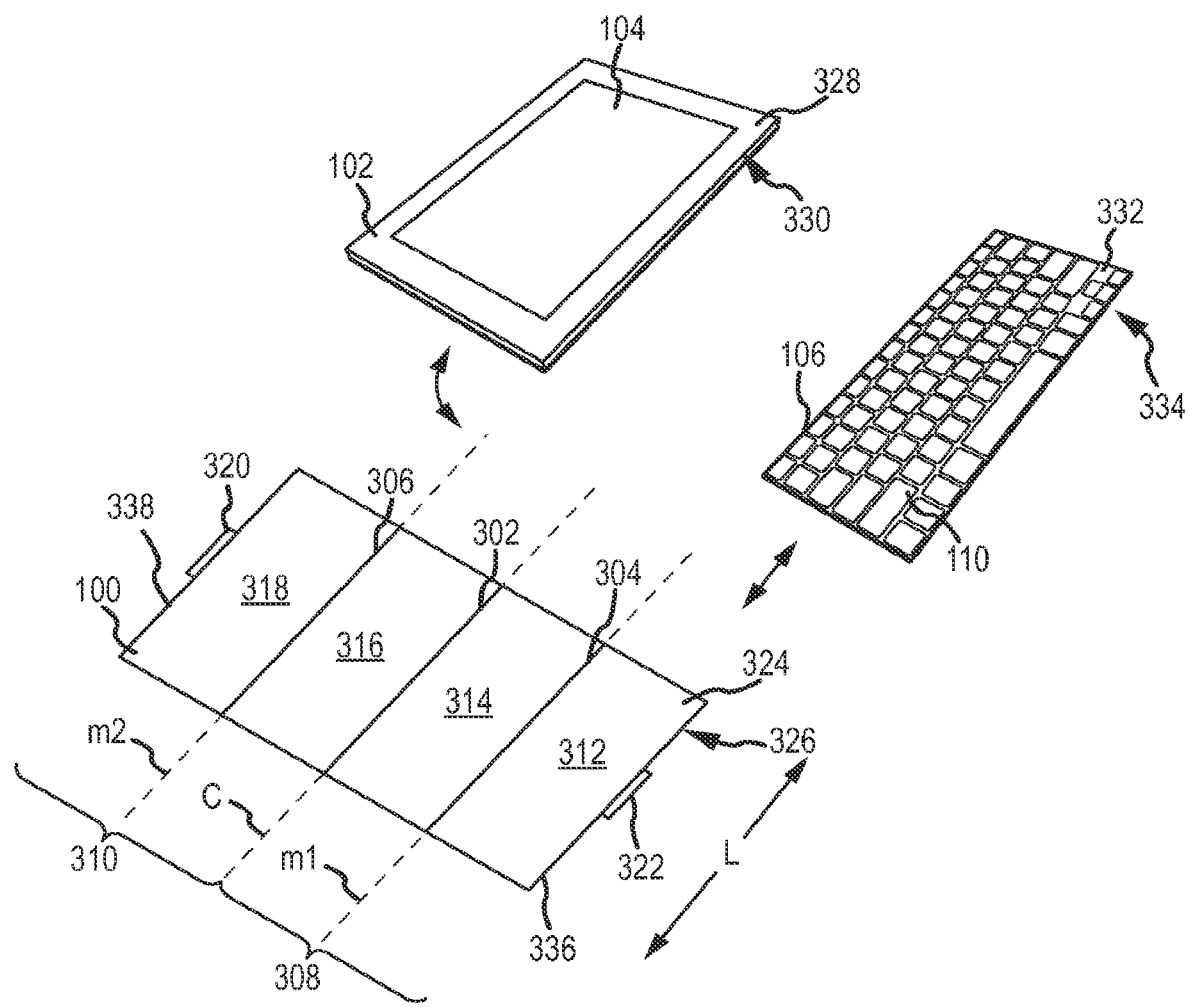
FIG. 3 is an exploded view of the cover, tablet computer, and keyboard shown in FIG. 1A.

Turning now to the cover 100 and the attachment of the cover 100 to the tablet computer 102 and to the keyboard 106, reference is made to FIG. 3. FIG. 3 is an exploded view that shows the tablet computer 102 and the keyboard 106 detached from the cover 100. As can be seen in FIG. 3, the cover 100 has an interior surface 324 and an opposing exterior surface 326. The interior surface 324 provides an engagement surface for the tablet computer 102 and the keyboard 106. Here, the rear surface 330 of the tablet computer 102 attaches to the interior surface 324 of the cover 100. Similarly, the rear surface 334 of the keyboard 106 attaches to the interior surface 324 of the cover 100. In this way, the exterior surface 326 of the cover 100 protects at least the rear surfaces 330 and 334 of the tablet computer 102 and the keyboard 106, respectively. The cover 100 may also be folded onto itself so as to protect the front surface 328 of the tablet computer 102 and the front surface 338 of the keyboard 106.

As can be seen in FIG. 3, the cover 100 is foldable at a number of perforations or hinges that extend along a length L of the cover 100. The hinges divide the cover 100 into a plurality of cover sections. In accordance with one embodiment, the cover 100 includes three hinges: a center hinge 302, a first lateral hinge 304, and a second lateral hinge 306. The center hinge 302 runs along the length L of the cover 106 and substantially corresponds to a centerline C of the cover 100. Thus, the center hinge 302 divides the cover 100 into a first cover half 308 and the second cover half 310. The first lateral hinge 304 runs along the length L of the cover 106 and substantially corresponds to a midline M1 of the first cover half 308. Thus, the first lateral hinge 304 divides the first cover half 308 into a first cover section 312 and a second cover section 314. Similarly, the second lateral hinge 306 runs along the length L of the cover 106 and substantially corresponds to a midline M2 of the second cover half 310. Thus, the second lateral hinge divides the second cover half 310 into a third cover section 316 and a fourth cover section 318.

In one embodiment, the keyboard 106 engages the cover 100 at the first cover section 312. In one embodiment, a rear surface 334 of the keyboard 106 is fixedly attached to the interior surface 324 of the cover 100 at the first cover section 312. As can also be seen in FIG. 3, the tablet computer 102 attaches to the cover 100 at the second cover section 314 and the third cover section 316. In one embodiment, a rear surface 330 of the tablet computer 102 is fixedly attached to the interior surface 324 of the cover 100 at both the second cover section 312 and the third cover section 316. In accordance with an alternative embodiment, the rear surface 330 of the tablet computer 102 is fixedly attached to one cover section and detachably attached to another cover section. For example, the tablet computer 102 may be fixedly attached to the first cover section 314 and detachably attached to the third cover section 316. This cover 100 embodiment is described in greater detail below in connection with FIG. 10.

As can be seen in FIG. 3, the cover 100 may additionally include a closure mechanism. The closure mechanism may include a first closure component 322 disposed on a first end 336 of the cover 100, where the first end 336 substantially corresponds to a lateral edge of the first section 312 of the cover 100. The closure mechanism may also include a second closure component 320 disposed on a second end 338 of the cover 100, where the first end 338 of the cover 100 substantially corresponds to a lateral edge of the fourth section 318. The first 322 and second 320 closure components are adapted to meet at substantially the centerline C of the cover 100 when the cover 100 folds on itself. As described in greater detail below, the first 322 and second 320 closure components are adapted to close a circuit or trigger some other action by meeting at substantially the centerline C of the cover 100 in order to disable the keyboard 100.

Figure 4:
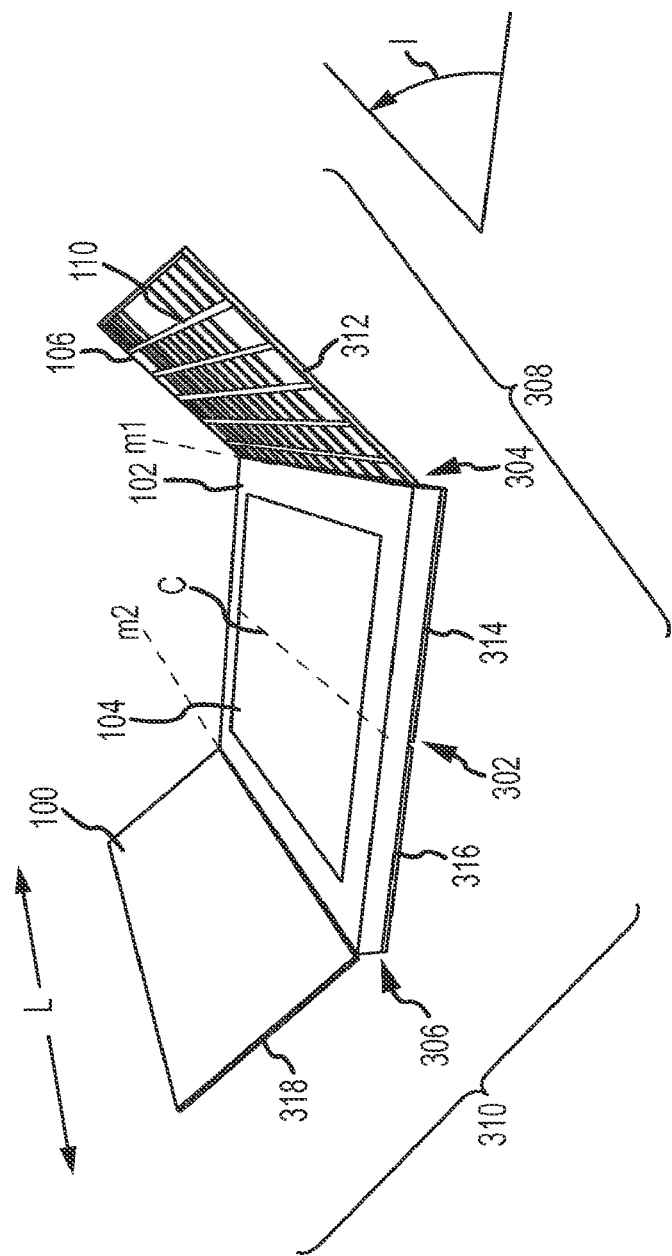
FIG. 4 is a perspective illustration of a partially closed configuration for the cover shown in FIG. 1A.

The cover opens and closes by bending, flexing, or otherwise moving at the hinges 302, 304, and 306. Turning now to description of the opening and closing of the cover 100, attention is directed to FIG. 4, which is a perspective illustration of the cover 100 attached to the tablet computer 102 and the keyboard 106. As shown in FIG. 4, the first cover section 312 may move in an inward direction I by rotating about the first lateral hinge 304. In this way, the first half 308 of the cover 100 moves such that the surface 110 of the keyboard 106 moves toward the touchscreen 104 of the tablet computer 102. Said another way, the cover 100 folds such that the first end 336 of the cover 100 rotates about the first lateral hinge 304 from the extended position shown in FIG. 1A towards a centerline C of the cover 100. When the first end 336 rotates about the first lateral hinge 304 in the inward direction I, the first end 336 rotates towards the interior surface 324 of the cover 100.

Similarly, the fourth cover section 318 may move in an inward direction I by rotating about the second lateral hinge 306. In this way, the second half 310 of the cover 310 moves such that an inside surface of the fourth cover section 318 moves toward the touchscreen 104 of the tablet computer 102. Said another way, the cover 100 folds such that the second end 338 of the cover 100 rotates about the second lateral hinge 306 from the extended position shown in FIG. 1A towards a centerline C of the cover 100. When the second end 338 rotates about the second lateral hinge 306 in the inward direction I, the second end 338 rotates towards the interior surface 324 of the cover 100.

Figure 5:
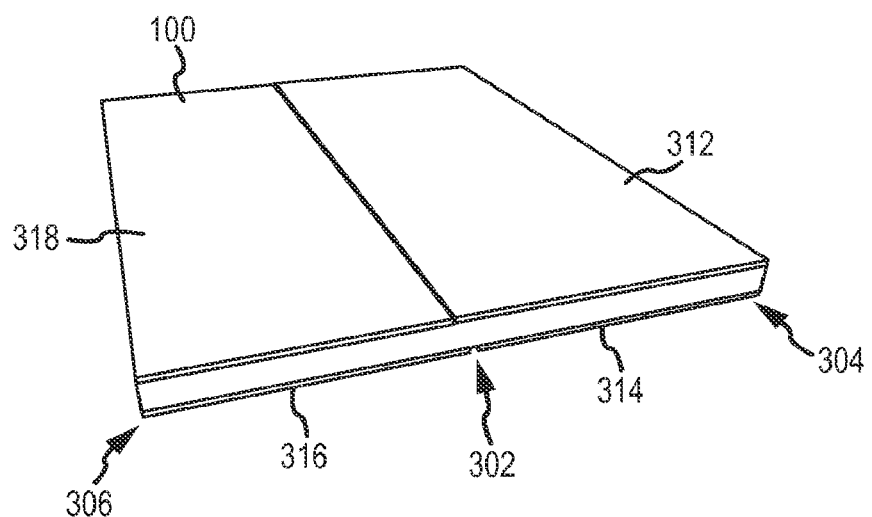
FIG. 5 is a perspective illustration of a fully closed configuration for the cover shown in FIG. 1A.

If the closing movement illustrated in FIG. 4 continues, the cover 100 will come to a fully closed configuration, which is illustrated in the perspective view of FIG. 5. As shown in FIG. 5, the hinge 304 has moved through substantially 180° of angular displacement in the inward direction I. Accordingly, the first half 308 of the cover 110 is in a fully closed position where the front surface 332 of the keyboard 106 rests against or is in otherwise gentle contact with the front surface 328 of the tablet computer 102. As also shown in FIG. 4, the hinge 306 has moved through substantially 180° of angular displacement in the inward direction I. Accordingly the second half of the cover is in a fully closed position where the interior surface 324 of the cover 100 rests against or is an otherwise gentle contact with the front surface 328 of the tablet computer 102. In the closed configuration of FIG. 4, the cover 100 protects both the front 328 and rear 330 surfaces of the tablet computer 102 and protects both the front 332 and rear surfaces 334 of the keyboard 106.

Figure 6:
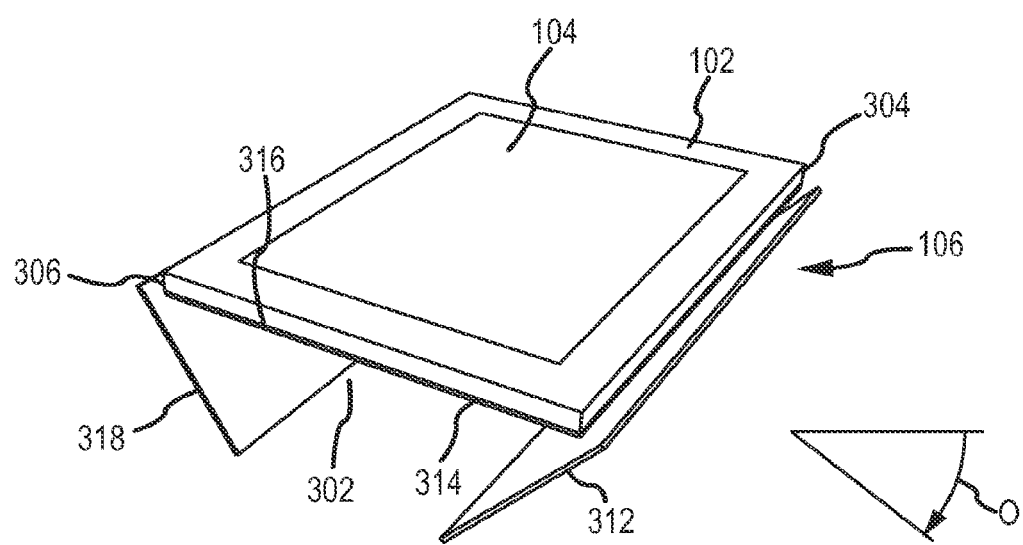
FIG. 6 is a perspective illustration of a partially open configuration for the cover shown in FIG. 1A.
Figure 7:
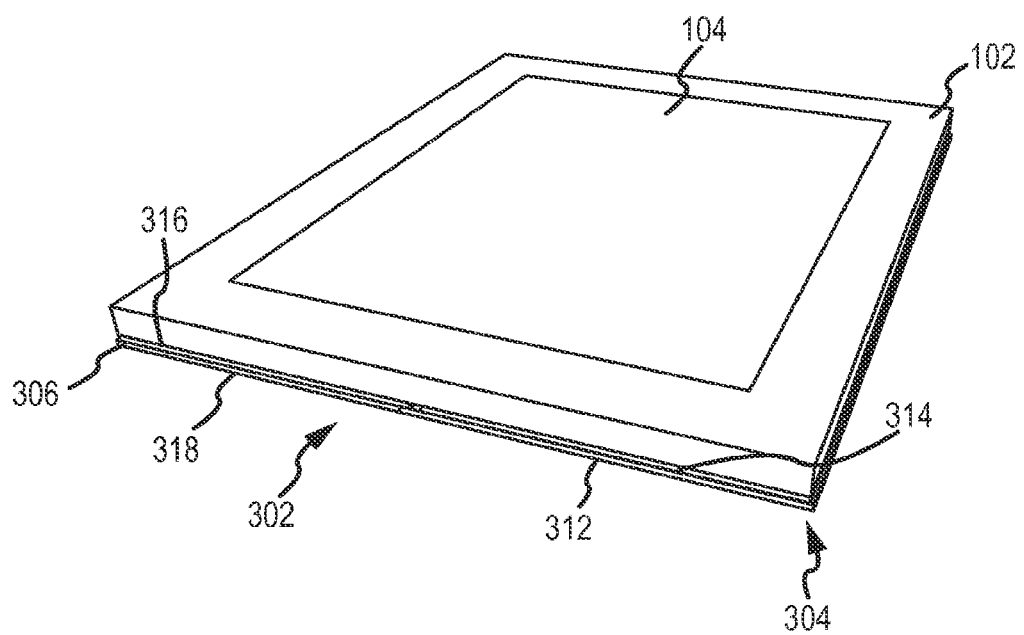
FIG. 7 is a perspective illustration of a fully open configuration for the cover shown in FIG. 1A.

In accordance with embodiments discussed herein, the hinges 304 and 306 are configured to move in both inward and outward direction. Movement of the hinges 304 and 306 in the inward direction is illustrated in FIG. 3 and FIG. 4. Movement of the hinges 304 and 306 in the outward direction is illustrated in FIG. 6 and FIG. 7. As shown in FIG. 6, the first cover section 312 may move in an outward direction O by rotating about the first lateral hinge 304. In this way, the first half 308 of the cover 100 moves such that the keyboard 106 moves away from the touchscreen 104 of the tablet computer 102. Said another way, the cover 100 folds such that the first end 336 of the cover 100 rotates about the first lateral hinge 304 from the extended position shown in FIG. 1A towards a centerline C of the cover 100. When the first end 336 rotates about the first lateral hinge 304 in the outward direction O, the first end 336 rotates away from the interior surface 324 of the cover 100.

Similarly, the fourth cover section 318 may move in an outward direction O by rotating about the second lateral hinge 306. In this way, the second half 310 of the cover 310 moves such that the fourth cover section 318 moves away from the tablet computer 102. Said another way, the cover 100 folds such that the second end 338 of the cover 100 rotates about the second lateral hinge 306 from the extended position shown in FIG. 1A towards a centerline C of the cover 100. When the second end 338 rotates about the second lateral hinge 306 in the outward direction O, the second end 338 rotates away from the interior surface 324 of the cover 100.

If the opening movement illustrated in FIG. 6 continues, the cover 100 will come to a fully open configuration, which is illustrated in the perspective view of FIG. 7. As shown in FIG. 7, the hinge 304 has moved through substantially 180° of angular displacement in the outward direction O. Accordingly, the first half 308 of the cover 110 is in a fully open position where the exterior surface 326 of the first cover section 312 rests against the exterior surface 326 of the second cover section 314. As also shown in FIG. 4, the hinge 306 has moved through substantially 180° of angular displacement in the outward direction. Accordingly, the second half 310 of the cover is in a fully closed position where the exterior surface 326 of the forth cover section 318 rests against the exterior surface 326 of the third cover section 316.

In the fully open configuration of FIG. 7, the tablet computer 102 is exposed and thereby accessible to the user. The keyboard 106, however, is tucked underneath the tablet computer 102 in a position that is not accessible by the user when the user is accessing the tablet computer 102. A user may orient the cover 100 in the fully open configuration of FIG. 7 when the user wishes to access the tablet computer 102, but not the keyboard 106. In one example, the user may wish to enter inputs through the touchscreen 104 of the tablet computer 102 rather than through the keyboard 106. In another example, the user may wish to view a video or use some other feature of the tablet computer 102 that does not require the user to enter inputs. In these cases, the keyboard 106 is not needed and so may be tucked away underneath the tablet computer 102.

Figure 8A:
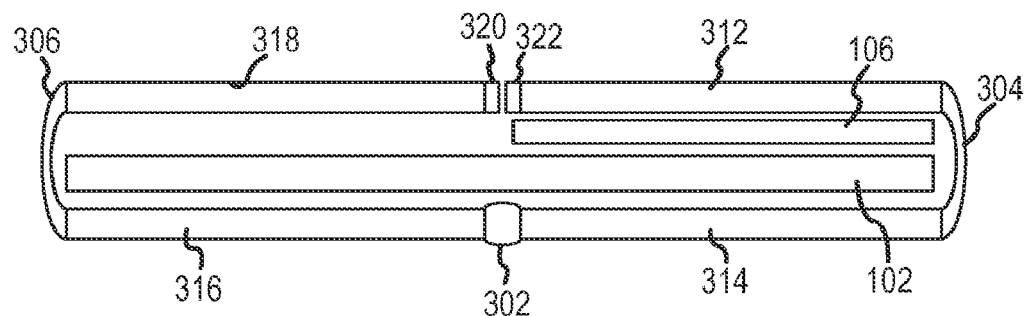
FIG. 8A is a cross-sectional side elevation view of the fully closed configuration shown in FIG. 5.

As described above in connection with FIG. 3, the cover 100 may include a closure mechanism having a first closure component 322 and a second closure component 320 that are adapted to meet at substantially the centerline C of the cover 100 when the cover 100 folds on itself. In one respect, first closure component 322 and a second closure component 320 engage when the cover closes as shown in FIG. 4. This engagement between the first closure component 322 and the second enclosure component 320 is shown in greater detail in the cross-sectional side elevation view shown in FIG. 8A. Here, the closure mechanism may operate to lock the cover 100 or to otherwise hold the cover in the fully closed configuration. In this position, the closure mechanism prevents the cover 100 from inadvertently opening and exposing the tablet computer 102 and/or the keyboard 106.

Thus, the closure mechanism protects the tablet computer 102 and the keyboard 106 from damage.

Figure 8B:
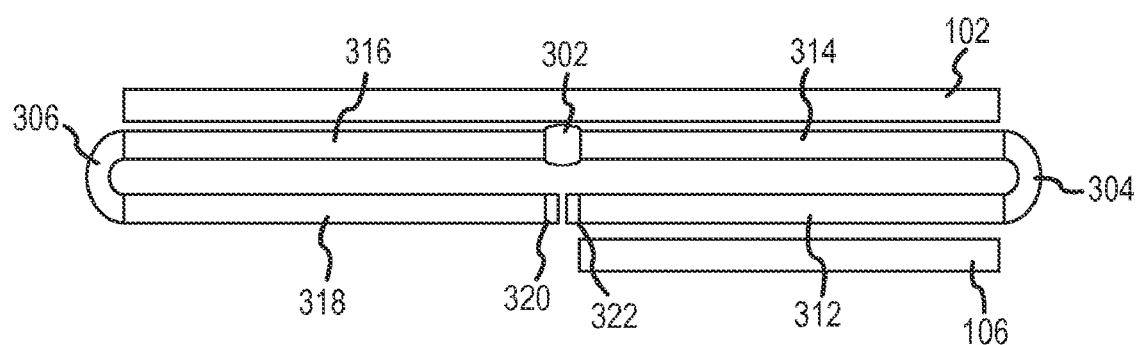
FIG. 8B is a cross-sectional side elevation view of the fully open configuration shown in FIG. 7.

In another respect, first closure component 322 and a second closure component 320 engage when the cover opens as shown in FIG. 7. This engagement between the first closure component 322 and the second enclosure component 320 is shown in greater detail in the cross-sectional side elevation view shown in FIG. 8B. Just as the closure mechanism operates to lock the cover 100 in the fully closed position, the closure mechanism may operate to lock the cover 100 in the fully open configuration. Here, the closure mechanism holds the keyboard 106 in place in the tucked away position. In this way, the closure mechanism prevents the keyboard 106 from falling away from the tablet computer 102 and becoming damaged when the tablet computer 102 is lifted.

In addition to locking the cover 100, the first 322 and second 320 closure components may be adapted to close a circuit or trigger some other action by meeting at substantially the centerline C of the cover 100 in order trigger a sleep mode or to otherwise disable the keyboard 106. The closure mechanism operates to disable the keyboard 106 in both the fully closed configuration shown in FIG. 5 and the fully open configuration shown in FIG. 7. The keyboard 106 may be disabled in the fully closed configuration because here the keyboard 106 is enclosed within the cover 100 and therefore not being used by the user. Similarly the keyboard 106 may be disabled in the fully open configuration because here the keyboard 106 is talked underneath the tablet computer 102 and therefore not being used by the user.

Figure 9:
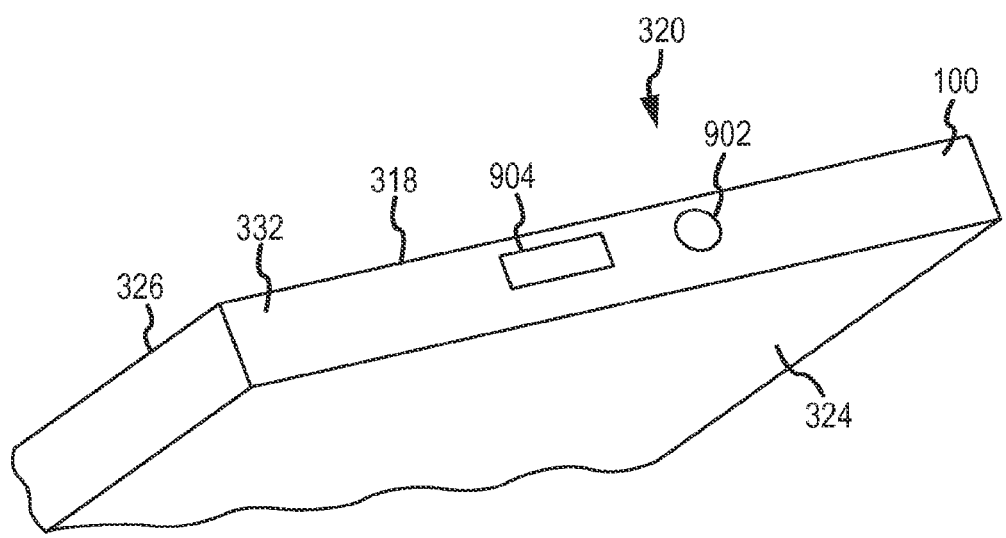
FIG. 9 is a close-up perspective illustration of an end of the cover shown in FIG. 1A.

Turning now to a discussion of the closure mechanism, reference is made to FIG. 9, which shows certain aspects of the second closure mechanism 320 in greater detail. FIG. 9 is a close-up perspective illustration of an end of the cover 100. By way of example, FIG. 9 shows the second end 332, which corresponds to the lateral edge of the fourth section 318 of the cover 100. The closure mechanism 320 is disposed on the second and 332 and may include a magnet 902. The magnet 902 is configured to engage a second magnet disposed on a corresponding location of the first end 336 of the cover 100. The magnet 902 engages with the magnet of the first end 336 when the first 336 and second 338 ends meet at substantially the centerline C of the cover 100. In this position, the magnets attract each other and in so doing exert a force on each other that holds the cover 100 in place. Here, the cover 100 may be held in either the fully closed configuration or in the fully open configuration depending on how the cover 100 is oriented by the user.

It should be appreciated that magnets are one possible type of closure mechanism that may be used to hold the cover 100 in place. In accordance with alternative embodiments the cover 100 may be held in place by buttons, snaps, buckles, Velcro, or other types of mechanical closures. Mechanical closures that include actuatable switches may be used in accordance with certain embodiments. If magnets are used, the magnets may be permanent magnets that are affixed to the ends of the cover. Alternatively, electromagnets that are enabled by an electrical current may be used. Here, the closure between the first and second and of the cover may be enabled or disabled by enabling or disabling the current between the electromagnets.

The first 322 and second 320 closure components may be adapted to close a circuit or trigger some other action by meeting at substantially the centerline C of the cover 100 in order trigger a sleep mode or to otherwise disable the keyboard 106. In this regard, the second end 338 of the cover 100 shown in FIG. 9 may include an electrical contact area 904. The electrical contact area 904 may engage a corresponding electrical contact area disposed on the first end 336 when the first 336 and second 338 ends meet at substantially the centerline C of the cover 100. In this position, the electrical contact areas 904 for may close a circuit within the cover 100. Closing the circuit then triggers a sleep mode in the keyboard 106. In certain embodiments, the contact areas 904 do not come into physical contact, but rather come into close proximity such that the conductive contacts 904 and the space between the conductive contacts 904 form a capacitive circuit element. By forming a capacitive circuit element, the conductive contact areas 904 may complete a circuit, which operates to trigger the sleep mode of the keyboard.

In certain embodiments, the magnets 902 may function to both hold the cover 100 in place and to complete a circuit that triggers the sleep mode in the keyboard 106. Specifically, as the magnets 902 may be made from a conductive material, the engagement between the magnets 902 may also be to close a circuit within the cover 100 that triggers the sleep mode in the keyboard 106.

Figure 10:
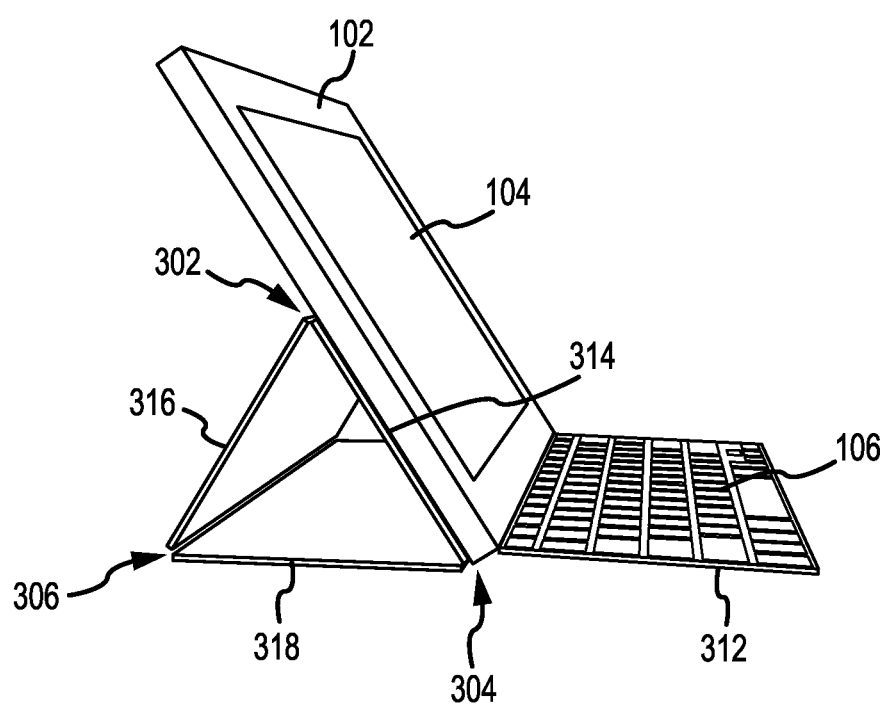
FIG. 10 is a perspective illustration of a standing configuration for the cover shown in FIG. 1A.

As described above, the rear surface of the tablet computer 102 may fixedly attached to one cover section and detachably attached to another cover section. In this standing configuration, which is shown in FIG. 10, the cover 100 may be placed into a configuration where the detachably attachable cover section moves away from engagement with the rear surface of the tablet computer 102 to form a portion of a stand that supports the tablet computer 102 in an upright orientation. This standing configuration of the cover 100 is shown in FIG. 10 where the tablet computer 102 is fixedly attached to the first cover section 314 and detachably attached to the third cover section 316.

In the standing configuration shown in FIG. 10, the second 314, third 316, and fourth 318 cover sections form a triangular shaped stand for the tablet computer 102. Here, the second cover section 314 remains fixedly attached to the rear surface of the tablet computer 102, while the third cover section 316 is allowed to fall away from engagement with the rear surface of the tablet computer 102. When the third cover section 316 falls away from the tablet computer 102, the third cover section 316 rotates about the center hinge 302 in the outward direction O. In this way, the second cover section 314 and the third cover section 316 form two legs of the triangular support for the tablet computer 102. The fourth cover section 318 forms the third leg of the triangular support by rotating about the second lateral hinge 306, also in the outward direction O. In this position, the fourth cover section 318 lies flat against a table or other surface on which the tablet computer 102 and keyboard 106 are placed. With the second 314, third 316, and fourth 318 cover sections forming a triangular shaped stand in this way, the tablet computer 102 is supported in an upright and angled position as shown in FIG. 10.

In the standing configuration shown in FIG. 10, the first cover section 312 and thus the keyboard 106 may also lie flat against the table or other surface on which the tablet computer 102 and the keyboard 106 are placed. In this position, the keyboard 106 sits adjacent to the tablet computer 102 in a position where the user may access the keyboard 106 for use in entering input into the tablet computer 102. Here, the tablet computer 102 and the keyboard 106 sit at an oblique angle with respect to each other due to the orientation of the tablet computer 102 as it sits against the stand form by the second 314, third 316, and fourth 318 cover sections. In the standing configuration shown in FIG. 10, the first cover section 312 is rotated to a certain degree about the first lateral hinge 304 in the inward direction I.

The foregoing description has broad application. Accordingly, the discussion of any embodiment is meant only to be an example and is not intended to suggest that the scope of the disclosure, including the claims, is limited to these examples.

I claim:

1. An electronic device cover for a computing device having a display screen, the electronic device cover comprising:
   a cover attached to the computing device, the cover comprising:
      a first section having a keyboard electrically connected to the computing device, the keyboard comprising a set of keys;
      a second section linked to the computing device;
      a hinge joining the first and second sections; and
      a closure mechanism;
   wherein in a first configuration of the cover relative to the computing device, the cover covers the display screen of the computing device and the closure mechanism triggers a disabled mode of the keyboard, the disabled mode being configured to put the keyboard to sleep independently from powering off the computing device;
   wherein in a second configuration of the cover relative to the computing device, the first section extends away from the display screen of the computing device.

2. The electronic device cover of claim 1, wherein the closure mechanism comprises a first magnet and a second magnet, the first magnet being positioned on the first section and the second magnet being positioned on the second section.

3. The electronic device cover of claim 1, wherein the disabled mode of the keyboard prevents touch input from being detected by the keyboard.

4. The electronic device cover of claim 1, wherein in the second configuration of the cover relative to the computing device, the second section is positioned behind the display screen of the computing device.

* * * * *